United States Patent
Markmiller

(10) Patent No.: US 9,586,670 B2
(45) Date of Patent: Mar. 7, 2017

(54) WINDSHIELD MOUNTING ASSEMBLY

(71) Applicant: AIRBUS HELICOPTERS DEUTSCHLAND GMBH, Donauworth (DE)

(72) Inventor: Johannes Markmiller, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 17 days.

(21) Appl. No.: 14/623,099

(22) Filed: Feb. 16, 2015

(65) Prior Publication Data

US 2015/0232169 A1    Aug. 20, 2015

(30) Foreign Application Priority Data

Feb. 18, 2014 (EP) ..................................... 14400009

(51) Int. Cl.
*B64C 1/14* (2006.01)
*B64C 27/04* (2006.01)
*B60J 1/00* (2006.01)

(52) U.S. Cl.
CPC ............. *B64C 1/1492* (2013.01); *B60J 1/007* (2013.01); *B64C 27/04* (2013.01)

(58) Field of Classification Search
CPC ...... B60J 1/007; B64C 1/1492; B64C 1/1484; B64C 1/1476
See application file for complete search history.

(56) References Cited

U.S. PATENT DOCUMENTS

| 2,784,926 | A | | 3/1957 | Bonza et al. |
| 2,939,186 | A | * | 6/1960 | Norwood ............. B64C 1/1492 188/181 R |
| 3,444,662 | A | | 5/1969 | Partain |
| 4,817,347 | A | | 4/1989 | Hand et al. |
| 4,905,935 | A | | 3/1990 | Uram, Jr. |
| 6,224,136 | B1 | | 5/2001 | Takagi |

(Continued)

FOREIGN PATENT DOCUMENTS

| EP | 0340961 | 11/1989 |
| EP | 2107001 | 10/2009 |

(Continued)

OTHER PUBLICATIONS

European Search Report for European Application No. 14400009, Completed by the European Patent Office on Aug. 28, 2014, 3 Pages.

(Continued)

*Primary Examiner* — Brian M O'Hara
(74) *Attorney, Agent, or Firm* — Brooks Kushman P.C.

(57) ABSTRACT

A windshield mounting assembly, comprising a windshield that is adapted to be arranged on an associated vehicle frame, the windshield comprising at least one edge that is provided with at least one lateral recess; at least one mounting frame that is attached to the windshield and adapted for mounting of the windshield to the associated vehicle frame, the mounting frame comprising at least one fastener receiving opening that is arranged in the region of the lateral recess and adapted to receive an associated frame fastener; and a bonding interface that is arranged at least partially between the edge of the windshield and the mounting frame, the bonding interface attaching the edge to the mounting frame.

19 Claims, 2 Drawing Sheets

(56) References Cited

U.S. PATENT DOCUMENTS

| | | | |
|---|---|---|---|
| 2003/0010867 A1 | 1/2003 | Wojatschek et al. | |
| 2003/0062450 A1 | 4/2003 | Dazet et al. | |
| 2011/0146793 A1* | 6/2011 | Comert | B60J 1/007 |
| | | | 136/259 |

FOREIGN PATENT DOCUMENTS

| | | |
|---|---|---|
| JP | 62246846 A | 10/1987 |
| JP | 11245660 | 9/1999 |
| JP | 2005306170 | 11/2005 |
| KR | 20020096698 | 12/2002 |

OTHER PUBLICATIONS

English translation of Japanese Official Action for corresponding Application No. 2015-006885, Sep. 26, 2016, 4 pages.

* cited by examiner

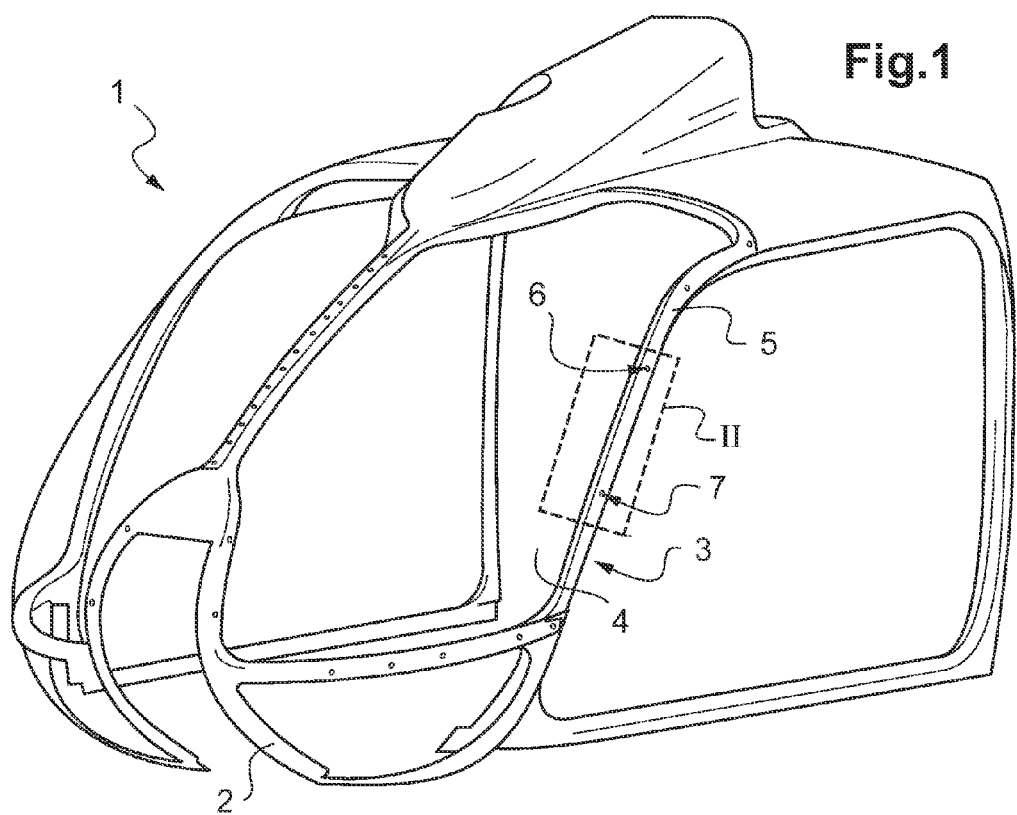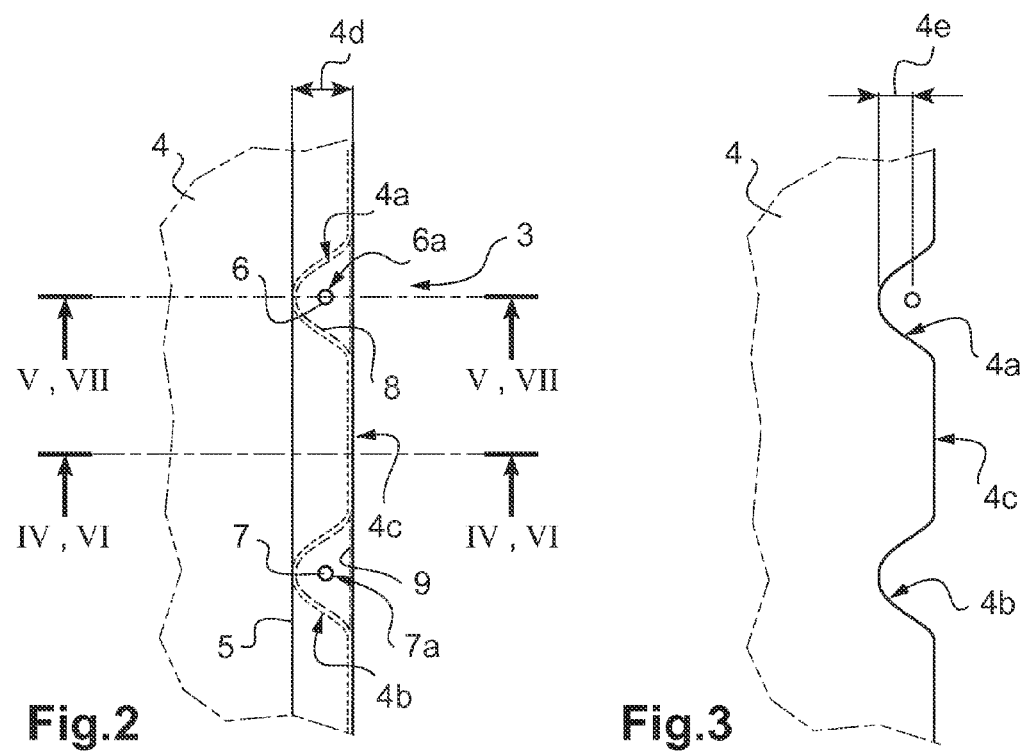

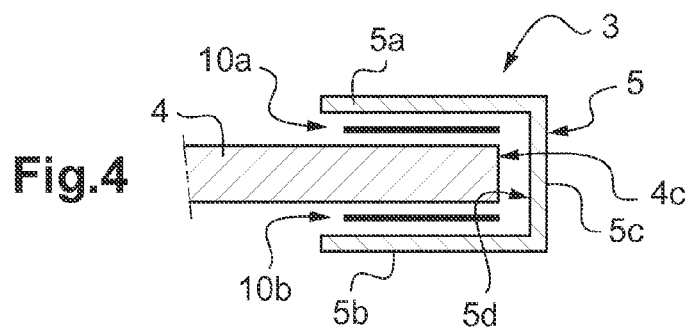
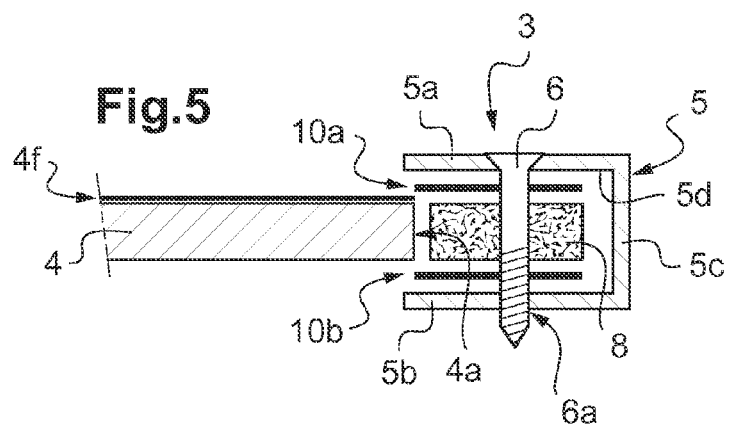
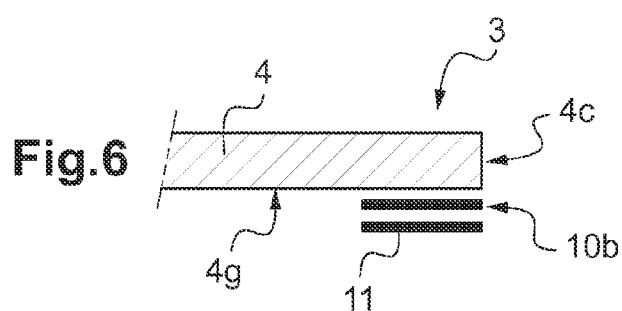
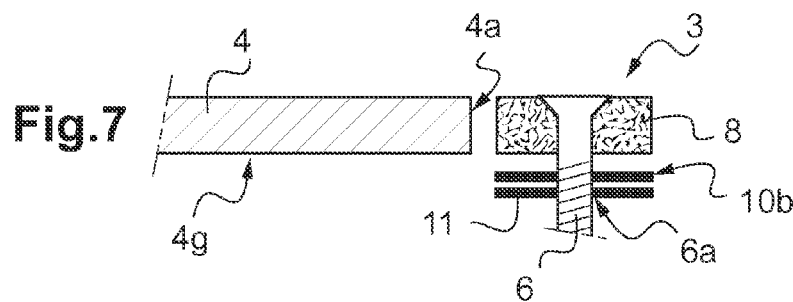

WINDSHIELD MOUNTING ASSEMBLY

CROSS REFERENCE TO RELATED APPLICATION

This application claims priority to European patent application No. EP 14 400009.8 filed on Feb. 18, 2014, the disclosure of which is incorporated in its entirety by reference herein.

BACKGROUND OF THE INVENTION (1) Field of the Invention

The invention is related to a windshield mounting assembly with a windshield that is adapted to be arranged on an associated vehicle frame and at least one mounting frame that is attached to said windshield, said windshield mounting assembly comprising the features of claim 1.

(2) Description of Related Art

Vehicle frames can be provided with one or more windshields that are configured to embody aerodynamically formed windows on a given front of corresponding vehicles. These windshields are provided in order to protect occupants of the corresponding vehicles from wind and potentially flying debris, such as insects and dust.

In order to allow for an easy replacement of a windshield that is damaged or broken, the windshield can be mounted to an associated vehicle frame via a mounting frame. Such a mounting frame does not only allow for a quick and easy exchange of a damaged or broken windshield, but also enables a required compatibility between the associated vehicle frame and specific material properties of the windshield, as well as transfer of loads between the windshield and the associated vehicle frame in operation of an underlying vehicle.

However, depending on an underlying application of a given windshield, i.e. an associated vehicle frame, different maximum load requirements are applied to the windshield and thus, or in addition, specific geometric constraints must be considered when designing the windshield and an associated mounting frame. For instance, if the vehicle frame defines an airframe of a helicopter, the maximum applicable load requirements are very high if the helicopter has a maximum takeoff weight of more than 3.175 kg, as the windshield of such a helicopter must be able to sustain a bird strike. Furthermore, a minimum available area of visibility for a pilot of the helicopter must be provided and, thus, represents an important geometric constraint for the design of the windshield and the associated mounting frame.

The document US 2003/0062450 A1 describes a windshield mounting assembly comprising a windshield and a mounting frame which has an inner section with predetermined inner dimensions corresponding to outer dimensions of the windshield. The windshield is bonded to this inner section of the mounting frame, which further comprises an outer section with predetermined outer dimensions that are larger than the predetermined inner dimensions and correspond to dimensions of an attachment or frame structure of an airframe, to which the outer section of the mounting frame is screwed. Corresponding holes for receiving suitable screws are provided in the outer section of the mounting frame, which is larger than the windshield, such that the holes are arranged completely outside of the windshield area.

However, such a mounting frame reduces the available area of visibility of the pilot. Furthermore, such a mounting frame is often difficult to integrate because of underlying geometric constraints.

The document U.S. Pat. No. 2,784,926 describes a windshield mounting assembly comprising a windshield and an associated mounting frame that is adapted for attachment of the windshield to an associated airframe, where the windshield is provided with an outer edge that is clamped in the mounting frame. The outer edge is provided with spaced scallops or notches that are adapted to receive suitable screws or bolts that are passed through associated holes in a channeled seal strip which encompasses the outer edge of the windshield and which defines the mounting frame.

In this configuration, the windshield is secured in the mounting frame by being clamped therein. Thus, only a limited load transfer between the windshield and the airframe can be realized by the mounting frame. This limited load transfer is, however, not sufficient for sustaining large loads such as bird strike, especially on comparatively large helicopter windows.

The document US 2003/0010867 A1 describes an alternative possibility for attachment of a windshield to an airframe. Accordingly, the windshield is directly screwed to the airframe with screws passing through holes drilled through the material of the windshield. These holes are arranged in the area of an outer edge of the windshield.

However, some materials that are usually used to embody windshields have a comparatively low bearing strength and/or are sensitive to local stress concentration and notches (e.g. Polycarbonate). Thus, providing windshields that are made up of such materials with holes that are arranged in the area of an outer edge thereof would weaken the windshields and lead to an increased risk of damage or breakage of such windshields. Therefore, such windshields are not suitable for use with helicopters having comparatively high maximum load requirements, especially if bird-strike proof is required.

The document EP 2 107 001 A1 describes another alternative possibility for attachment of a windshield to an airframe, according to which the windshield is directly bonded to the airframe. However, in this case replacement of the windshield can be difficult and time-consuming if the windshield is damaged or broken in operation.

It should be noted that similar or different attachment possibilities and/or windshield mounting assemblies are described in the documents JP 11 245 660 A, KR 2002 0096698 A and JP 2005 306170 A. However, all of these attachment possibilities and/or windshield mounting assemblies have at least one of the above described drawbacks.

BRIEF SUMMARY OF THE INVENTION

It is, therefore, an object of the present invention to provide a windshield mounting assembly that overcomes the above described drawbacks.

This object is solved by a windshield mounting assembly comprising the features of claim 1.

More specifically, according to the invention a windshield mounting assembly comprises a windshield, at least one mounting frame and a bonding interface. Said windshield is adapted to be arranged on an associated vehicle frame and comprises at least one edge that is provided with at least one lateral recess. Said at least one mounting frame is attached to said windshield and adapted for mounting of said windshield to said associated vehicle frame. Said at least one mounting frame comprises at least one fastener receiving opening that is arranged in the region of the at least one lateral recess and adapted to receive an associated frame fastener. Said bonding interface is arranged at least partially between said at least one edge of said windshield and said at least one mounting frame. Said bonding interface attaches said at least one edge to said at least one mounting frame.

The inventive windshield mounting assembly can be applied advantageously to a wide range of vehicles including, but not being limited to, helicopters, aircrafts, cars and vessels. Furthermore, as the inventive windshield mounting assembly is attached to an associated vehicle frame by means of suitable frame fasteners, especially screws, the assembly can easily be replaced if necessary. Moreover, the inventive mounting frame does not interfere with an underlying required area of visibility and is more compact compared to conventional mounting frame designs. Also, as an underlying bearing strength of materials used for implementing the mounting frame, e.g. composite materials, is typically much higher than the bearing strength of corresponding windshield materials, very high loads can be transferred from the mounting frame via the frame fasteners, i.e. the screws, to the vehicle frame. Simultaneously, no bearing loads or high stress concentration are exerted on the windshield.

Advantageously, windshields according to the present invention can be made of any transparent material that is usually used for manufacturing windshields. This includes e.g. glass, laminated glass and polymers, like poly-methyl methacrylate (PMMA) and polycarbonate (PC). Preferably, the windshields are coated for surface protection and comprise at least approximately straight or curved outer edges that are provided with at least one and, preferentially, a plurality of recesses.

These recesses are preferably milled at the edges, but can alternatively also be made using a different manufacturing technology. Each recess can be embodied with a radius greater than 10 to 20 mm such that a smooth transition between an associated edge and the recess is provided. Thus, stress concentration at the edges of the windshields can be reduced significantly compared e.g. to windshields having holes drilled at the edges, so that a higher transfer of loads in the area of the recesses can be realized.

By providing such recesses, the windshields are not directly mounted to associated vehicle frames using fasteners and form fit. Instead, the windshields and, more specifically, their outer edges are attached to mounting frames via suitable bonding interfaces, i.e. preferably bonded to the mounting frames by means of soft glues, such as polyurethane (PU) glues.

Corresponding bonding interfaces and areas of bonding are advantageously as wide as the milled recesses or even wider, thereby allowing a sufficient area for load transfer to the associated vehicle frame. With respect to the windshields, the areas of bonding are preferably all along the mounting frames and the outer edges of the windshields, except at the locations of the recesses.

The mounting frames surrounding the windshields can have the same outer dimensions as the windshields. Preferably they comprise at least the same width as the milled recesses to cover them entirely. Therefore, it is not necessary to position the mounting frame inside an associated mounting area provided in the associated vehicle frame for the creation of windows.

Preferably, the mounting frames are at least approximately U-shaped in cross section and surround and encompass the edges of the windshields and are, therefore, bonded to the outer and inner sides of the windshields. Alternatively, flat mounting frames can be used which are only glued to one side of the windshields, i.e. the outer or the inner side thereof. The mounting frames are preferably embodied using a material that has a higher bearing strength than the windshield material, e.g. a composite material such as carbon fiber reinforced polymer (CFRP) or glass fiber reinforced polymer (GFRP), and/or a metal such as aluminum.

The mounting frames are preferably attached to associated vehicle frames using suitable fasteners, such as screws. The use of such fasteners allows a fast exchange of the windshields in service if the associated mounting frames are already bonded to the windshields. Preferably, such fasteners are positioned at the locations of the milled recesses, where holes are drilled into the mounting frames and the vehicle frames.

As described above, these holes do not traverse the windshields. Loads applied to the windshields are, therefore, transferred from the windshields via the bonding interfaces to the mounting frames and then from the mounting frames to the associated vehicle frames via the fasteners. To avoid gaps between the windshields and the mounting frames, the recesses can be filled with suitable filling elements or spacers and holes implementing fastener receiving openings can be drilled through these spacers to enable passing through of the fasteners.

According to a preferred embodiment, at least one filling element is arranged in the region of said at least one lateral recess for filling said at least one lateral recess, said at least one filling element being provided with said at least one fastener receiving opening.

According to a further preferred embodiment, said at least one lateral recess is at least partially arc-shaped with a curvature radius of at least 10 mm.

According to a further preferred embodiment, said windshield comprises a transparent, light-permeable material selected from the group consisting of glass, laminated glass and polymers, said polymers comprising at least poly-methyl methacrylate and polycarbonate.

According to a further preferred embodiment, said windshield comprises a surface protecting coating.

According to a further preferred embodiment, said bonding interface is embodied at least partially by a soft glue.

According to a further preferred embodiment, said soft glue comprises a polyurethane glue.

According to a further preferred embodiment, said bonding interface covers said at least one edge at least over a length that is equal or greater than a depth of said at least one lateral recess.

According to a further preferred embodiment, said at least one mounting frame encompasses at least said at least one lateral recess.

According to a further preferred embodiment, said at least one mounting frame is at least partially U-shaped.

According to a further preferred embodiment, said at least one mounting frame defines an inner frame groove that is adapted to receive at least said at least one edge of said windshield.

According to a further preferred embodiment, said at least one mounting frame is at least partially embodied as a flat-type mounting frame.

According to a further preferred embodiment, said at least one mounting frame is embodied using a first material having a higher bearing strength than a second material that is used to embody said windshield.

According to a further preferred embodiment, said at least one mounting frame comprises a composite material and/or a metal.

According to a further preferred embodiment, said composite material comprises a carbon fiber reinforced polymer and/or a glass fiber reinforced polymer, and said metal comprises aluminum.

According to a further preferred embodiment, said at least one fastener receiving opening is adapted to receive at least one screw defining the associated frame fastener.

The present invention further provides a windshield that is adapted to be arranged on an associated vehicle frame, said windshield comprising at least one edge that is provided with at least one lateral recess, said at least one lateral recess being at least partially arc-shaped with a curvature radius of at least 10 mm.

The present invention further provides an airframe with a windshield mounting assembly that comprises a windshield, at least one mounting frame and a bonding interface. Said windshield is adapted to be arranged on said airframe and comprises at least one edge that is provided with at least one lateral recess. Said at least one mounting frame is attached to said windshield and adapted for mounting of said windshield to said airframe. Said at least one mounting frame comprises at least one fastener receiving opening that is arranged in the region of the at least one lateral recess and adapted to receive an associated frame fastener. Said bonding interface is arranged at least partially between said at least one edge of said windshield and said at least one mounting frame. Said bonding interface attaches said at least one edge to said at least one mounting frame.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 1 shows a perspective view of a vehicle frame with a windshield mounting assembly according to the invention, FIG. 2 shows a top view of a section of the windshield mounting assembly of FIG. 1 according to a first embodiment, FIG. 3 shows a top view of a section of a windshield of FIG. 2, FIG. 4 shows a cross section along the cut line IV-IV of FIG. 2 of the windshield mounting assembly of FIG. 2, FIG. 5 shows a cross section along the cut line V-V of FIG. 2 of the windshield mounting assembly of FIG. 2, FIG. 6 shows a cross section along the cut line VI-VI of FIG. 2 of the windshield mounting assembly of FIG. 2, which is embodied according to a second embodiment, and FIG. 7 shows a cross section along the cut line VII-VII of FIG. 2 of the windshield mounting assembly of FIG. 2, which is embodied according to the second embodiment of FIG. 6.

DETAILED DESCRIPTION OF THE INVENTION

FIG. 1 shows an exemplary vehicle frame 1 with a windshield mounting assembly 3 according to the present invention. By way of example, the vehicle frame 1 is embodied, and hereinafter referred to, as an airframe of a helicopter and, more specifically, as a segment of a fuselage side frame thereof, which illustratively represents the cockpit frame 2 of the helicopter. The helicopter is, however, not shown in greater detail for simplicity and clarity of the drawings.

It should be noted that the present invention is not limited to mounting of the inventive windshield mounting assembly 3 to the cockpit frame 2 of a helicopter. Instead, the inventive windshield mounting assembly 3 can be mounted to multiple different frame structures, such as e.g. frame structures of aircrafts in general, frame structures of cars, frame structures of vessels and so on.

Preferably, the windshield mounting assembly 3 comprises a windshield 4 that is adapted to be arranged on the airframe 1, i.e. the cockpit frame 2. The windshield 4 is preferentially embodied using a transparent, light-permeable material. By way of example, the windshield 4 comprises glass, laminated glass and/or polymers, such as PMMA or PC.

The windshield mounting assembly 3 preferably further comprises at least one mounting frame 5 that is attached to the windshield 4. More specifically, the windshield 4 is attached to the at least one mounting frame 5 by means of an associated bonding interface (10a, 10b in FIG. 4 and FIG. 5), as described below with reference to FIG. 4 and FIG. 5.

The at least one mounting frame 5 is preferably adapted for mounting of the windshield 4 to the airframe 1, i.e. the cockpit frame 2, by means of associated frame fasteners 6, 7, such as e.g. screws. Thereby, the at least one mounting frame 5 can be embodied as a single mounting frame, a plurality of separate mounting frame segments or plural separate mounting frames.

Preferably, the mounting frame 5 is embodied using a material having a higher bearing strength than the above described material that is used to embody the windshield 4. By way of example, the mounting frame 5 can be realized using a composite material, such as CFRP and/or GFRP, and/or using a metal, such as aluminum.

FIG. 2 shows the windshield mounting assembly 3 of FIG. 1 with the windshield 4 and the mounting frame 5. The frame fasteners 6, 7 of FIG. 1 are illustratively received in associated frame fastener receiving openings 6a, 7a, which are provided in the mounting frame 5 and adapted to receive at least one screw defining these frame fasteners 6, 7.

Preferably, the windshield 4 comprises a predetermined number of outer edges that are preferentially at least essentially straight or curved. From this predetermined number of outer edges, a single edge 4c is illustrated by way of example. This single edge 4c is preferably provided with at least one and exemplarily two lateral recesses 4a, 4b, each one being at least partially arc-shaped or curved and having an associated depth 4d.

At least one and preferably each one of the two lateral recesses 4a, 4b is encompassed by the mounting frame 5. More specifically, the single edge 4c is encompassed by the mounting frame 5 preferably at least in the region of the two recesses 4a, 4b and, preferentially, at least over an encompassing length that is equal or greater than the depth 4d of the two lateral recesses 4a, 4b. Here, the encompassing length exemplarily equals the depth 4d and is, therefore, designated with the same reference sign.

Preferably, at least one filling element is arranged in the region of at least one of the two lateral recesses 4a, 4b for filling said at least one of the two lateral recesses 4a, 4b with respect to the mounting frame 5. Illustratively, each one of the two lateral recesses 4a, 4b is provided with an associated filling element 8, 9 in the form of a spacer. In order to enable the frame fasteners 6, 7 to pass through these spacers 8, 9, the frame fastener receiving openings 6a, 7a traverse not only the mounting frame 5, but also the spacers 8, 9. In other words, the spacers 8, 9 are also provided with the frame fastener receiving openings 6a, 7a, which are arranged in the region of the lateral recesses 4a, 4b and adapted to receive the frame fasteners 6, 7.

FIG. 3 shows the windshield 4 of FIG. 2 in order to further illustrate the two lateral recesses 4a, 4b provided at the single edge 4c thereof. Each one of the two at least partially arc-shaped or curved lateral recesses 4a, 4b preferably comprises a curvature radius 4e of at least 10 mm and, preferentially, 10 mm to 20 mm.

FIG. 4 shows the windshield mounting assembly 3 of FIG. 1 and FIG. 2 with the windshield 4 and the mounting frame 5 in a region beyond the two lateral recesses 4a, 4b of the windshield 4. According to a first embodiment, the mounting frame 5 is at least partially U-shaped in cross section having two frame legs or side walls 5a, 5b that are interconnected via a leg connecting wall 5c. These side walls 5a, 5b and the connecting wall 5c define an inner frame groove 5d that is adapted to receive the single edge 4c of the windshield 4.

Preferably, a bonding interface 10a, 10b is arranged at least partially between the single edge 4c of the windshield 4 and the mounting frame 5. This bonding interface 10a, 10b attaches the single edge 4c to the mounting frame 5 and is e.g. at least partially realized by a soft glue, such as a PU glue.

By way of example, the bonding interface 10a, 10b comprises two layers 10a, 10b of PU glue. A first layer 10a is illustratively provided between the side wall 5a of the mounting frame 5 and the windshield 4, and a second layer 10b is illustratively provided between the side wall 5b of the mounting frame 5 and the windshield 4.

FIG. 5 shows the windshield mounting assembly 3 of FIG. 1 and FIG. 2 with the windshield 4 and the mounting frame 5 in the region of the lateral recess 4a of the windshield 4, which is illustratively provided with an optional surface protecting coating 4f. As described above with reference to FIG. 2, the lateral recess 4a is filled with the spacer 8 and the mounting frame 5 and this spacer 8 comprise the frame fastener receiving opening 6a, wherein the frame fastener 6 is exemplarily arranged.

Preferably, the spacer 8 is bonded to the mounting frame 5 by the bonding interface 10a, 10b, i.e. by the two layers 10a, 10b of PU glue. Each one of the first and second layers 10a, 10b and, thus, the bonding interface 10a, 10b, preferably covers at least the spacer 8 and, preferentially, the complete single edge 4c of the windshield 4 of FIG. 2, at least over a length that is equal or greater than the depth 4d of FIG. 2 of the lateral recess 4a.

FIG. 6 shows the windshield mounting assembly 3 of FIG. 1 and FIG. 2 with the windshield 4 and a mounting frame 11 according to a second embodiment, in a region beyond the two lateral recesses 4a, 4b of the windshield 4. According to this second embodiment, the mounting frame 11 is at least partially realized as a flat-type or plate-like mounting frame.

Illustratively, this flat-type mounting frame 11 is connected to an airframe facing side 4g of the windshield 4 via the bonding interface, i.e. the PU glue layer 10b of FIG. 4. This airframe facing side 4g is exemplarily opposite to the windshield side having the optional surface protecting coating 4f according to FIG. 5.

FIG. 7 shows the windshield mounting assembly 3 of FIG. 1 and FIG. 2 with the windshield 4 and the mounting frame 11 according to the second embodiment of FIG. 6, in the region of the lateral recess 4a of the windshield 4. As described above with reference to FIG. 2, the lateral recess 4a is filled with the spacer 8 and the mounting frame 11 and this spacer 8 comprise the frame fastener receiving opening 6a, wherein the frame fastener 6 is exemplarily arranged.

Preferably, the spacer 8 is bonded to the mounting frame 11 by the bonding interface 10b, i.e. by the layer 10b of PU glue. This layer 10b and, thus, the bonding interface 10b, preferably covers at least the spacer 8 and, preferentially, the complete single edge 4c of the windshield 4 of FIG. 2, at least over a length that is equal or greater than the depth 4d of FIG. 2 of the lateral recess 4a.

It should be noted that modifications and variations to the above described embodiments are within the common knowledge of the person skilled in the art. For instance, the mounting frame 5 of FIG. 4 and FIG. 5 and the mounting frame 11 of FIG. 6 and FIG. 7 could be combined to a mounting frame which is e.g. U-shaped in the region of the lateral recesses 4a, 4b of FIG. 2, and flat in regions outside of these lateral recesses 4a, 4b, and vice versa. Furthermore, the mounting frame 11 of FIG. 6 and FIG. 7 could be attached to the side of the windshield 4 that is opposite to the airframe facing side 4g. Accordingly, all such modifications and variations are considered as being part of the present invention.

REFERENCE LIST 1 airframe
2 cockpit frame
3 windshield mounting assembly
4 windshield
4a, 4b lateral windshield recesses
4c windshield edge
4d recess depth
4e recess curvature radius
4f windshield surface protecting coating
4g airframe facing side
5 U-shaped mounting frame
5a, 5b frame legs
5c leg connecting wall
5d inner frame groove
6, 7 frame fasteners
6a, 7a fastener receiving openings
8, 9 filling elements
10a, 10b bonding interfaces
11 flat-type mounting frame

What is claimed is:
1. A windshield mounting assembly, comprising:
   a windshield that is adapted to be arranged on an associated vehicle frame, the windshield comprising at least one peripheral edge that is provided with at least one lateral recess notched into the at least one edge;
   at least one mounting frame that is attached to the windshield for mounting of the windshield to the associated vehicle frame, the at least one mounting frame comprising at least one fastener receiving opening that is aligned with the at least one lateral recess to receive an associated frame fastener for fastening the mounting frame to the associated vehicle frame; and
   a bonding interface that is arranged at least partially between the at least one edge of the windshield and the at least one mounting frame, the bonding interface directly bonding the at least one edge of the windshield to the at least one mounting frame.

2. The assembly according to claim 1, wherein at least one filling element is arranged in the at least one lateral recess for filling the at least one lateral recess, the at least one filling element being provided with the at least one fastener receiving opening.

3. The assembly according to claim 1, wherein the at least one lateral recess is at least partially arc-shaped with a curvature radius of at least 10 mm.

4. The assembly according to claim 1, wherein the windshield comprises a transparent, light-permeable material selected from the group consisting of glass, laminated glass and polymers, the polymers comprising at least poly-methyl methacrylate and polycarbonate.

5. The assembly according to claim 1, wherein the windshield comprises a surface protecting coating.

6. The assembly according to claim 1, wherein the bonding interface is embodied at least partially by a soft glue.

7. The assembly according to claim 6, wherein the soft glue comprises a polyurethane glue.

8. The assembly according to claim 1, wherein the bonding interface covers the at least one edge at least over a length that is equal or greater than a depth of the at least one lateral recess.

9. The assembly according to claim 1, wherein the at least one mounting frame encompasses the at least one lateral recess.

10. The assembly according to claim 1, wherein the at least one mounting frame is at least partially U-shaped.

11. The assembly according to claim 10, wherein the at least one mounting frame defines an inner frame groove that is adapted to receive the at least one edge of the windshield.

12. The assembly according to claim 1, wherein the at least one mounting frame is at least partially embodied as a flat-type mounting frame.

13. The assembly according to claim 1, wherein the at least one mounting frame is embodied using a first material having a higher bearing strength than a second material that is used to embody the windshield.

14. The assembly according to claim 1, wherein the at least one mounting frame comprises at least one of a composite material and a metal.

15. The assembly according to claim 1, wherein the at least one mounting frame comprises at least one of a carbon fiber reinforced polymer, a glass fiber reinforced polymer, and aluminum.

16. The assembly according to claim 1, wherein the at least one fastener receiving opening is adapted to receive at least one screw defining the associated frame fastener.

17. The assembly according to claim 1 wherein the windshield has a first side and a second opposed side;
wherein the at least one mounting frame comprises first and second frame legs interconnected via a leg connecting wall, the first and second frame legs being parallel to one another; and
wherein the bonding interface comprises a first layer of glue directly bonding the first side of the windshield to the first frame leg, and a second layer of glue directly binding the second side of the windshield to the second frame leg.

18. An airframe with a windshield mounting assembly that comprises:
a windshield that is adapted to be arranged on the airframe, the windshield comprising at least one peripheral edge that is provided with at least one lateral recess notched into the at least one peripheral edge;
at least one mounting frame that is attached to the windshield and adapted for mounting of the windshield to the airframe, the at least one mounting frame comprising at least one fastener receiving opening that is arranged in a region of the at least one lateral recess and adapted to receive an associated frame fastener;
at least one associated frame fastener, each frame fastener received by an associated one of the at least one fastener receiving opening and extending through an associated one of the at least one lateral recess, the at least one frame fastener directly connecting the at least one mounting frame to the airframe; and
a bonding interface that is arranged at least partially between the at least one edge of the windshield and the at least one mounting frame, the bonding interface directly bonding the at least one edge of the windshield to the at least one mounting frame.

19. The airframe of claim 18 wherein the bonding interface comprises at least one layer of glue positioned between and directly bonding the windshield to the mounting frame; and
wherein a load applied to the windshield is transferred from the windshield via the bonding interface to the at least one mounting frame and then from the at least one mounting frame to the airframe via the at least one associated frame fastener.

\* \* \* \* \*